United States Patent

Feng et al.

[11] Patent Number: 5,878,481
[45] Date of Patent: Mar. 9, 1999

[54] POLE TRIMMING METHOD FOR FABRICATING A MAGNETIC TRANSDUCER STRUCTURE

[75] Inventors: Yong-Chang Feng, Livermore; Cherng-Chyi Han; Cheng Tzong Horng, both of San Jose, all of Calif.

[73] Assignee: Headway Technologies, Inc., Milpitas, Calif.

[21] Appl. No.: 845,875

[22] Filed: Apr. 28, 1997

[51] Int. Cl.[6] .................................................. G11B 5/127
[52] U.S. Cl. ....................................................... 29/603.15
[58] Field of Search ........................... 29/603.15, 603.13, 29/603.16, 603.18

[56] References Cited

U.S. PATENT DOCUMENTS 5,438,747 8/1995 Krounbi et al. ............................ 29/603
5,763,911 6/1998 Matthews et al. ....................... 257/301

*Primary Examiner*—David A. Scherbel
*Assistant Examiner*—Benjamin M. Halpern
*Attorney, Agent, or Firm*—George O. Saile; Stephen B. Ackerman; Alek P. Szecsy

[57] ABSTRACT

A method for forming a magnetic transducer structure. There is first provided a substrate. There is then formed over the substrate a lower magnetic pole layer. There is then formed upon the lower magnetic pole layer a gap filling dielectric layer. There is then formed at least in part upon the gap filling dielectric layer a patterned positive photoresist layer employed in defining through a plating method an upper magnetic pole layer formed at least in part upon the gap filling dielectric layer. The patterned photoresist layer has a first region defining a pole tip of the upper magnetic pole layer and a second region defining a magnetic coil region of the upper magnetic pole layer. The first region of the patterned positive photoresist layer is photoexposed either before or after forming through the plating method the upper magnetic pole layer defined by the patterned positive photoresist layer. The first region of the patterned positive photoresist layer is developed after forming through the plating method the upper magnetic pole layer. Finally, there is then anisotropically etched the upper magnetic pole layer, the gap filling dielectric layer and the lower magnetic pole layer at the location of the first region of the patterned photoresist layer to form an etched upper magnetic pole layer, an etched gap filling dielectric layer and an etched lower magnetic pole layer while employing an anisotropic etch method having a first etch selectivity of the gap filling dielectric layer with respect to the upper magnetic pole layer of at least about 2:1 and a second etch selectivity of the lower magnetic pole layer with respect to the upper magnetic pole layer of at least about 1:1.

7 Claims, 6 Drawing Sheets

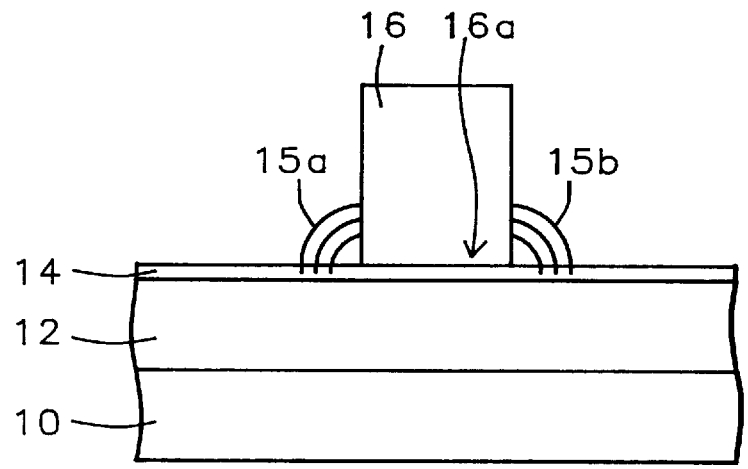
*FIG. 1 - Prior Art*
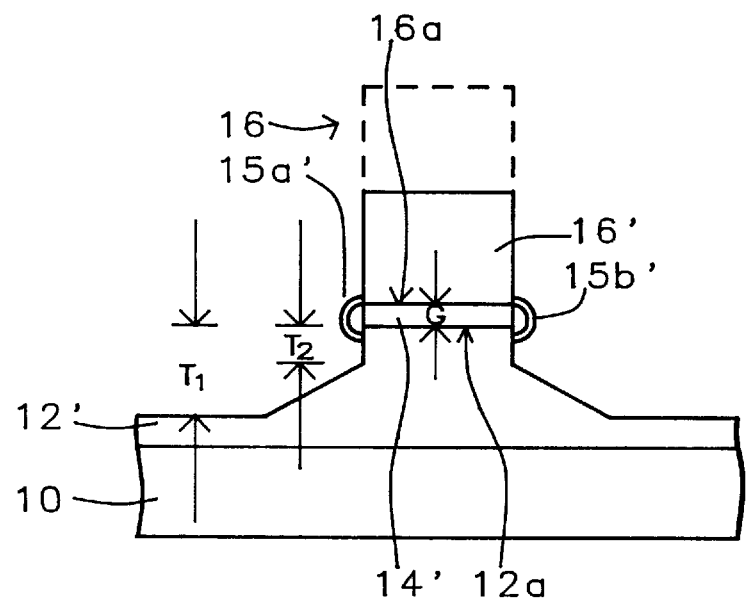
*FIG. 2 - Prior Art*

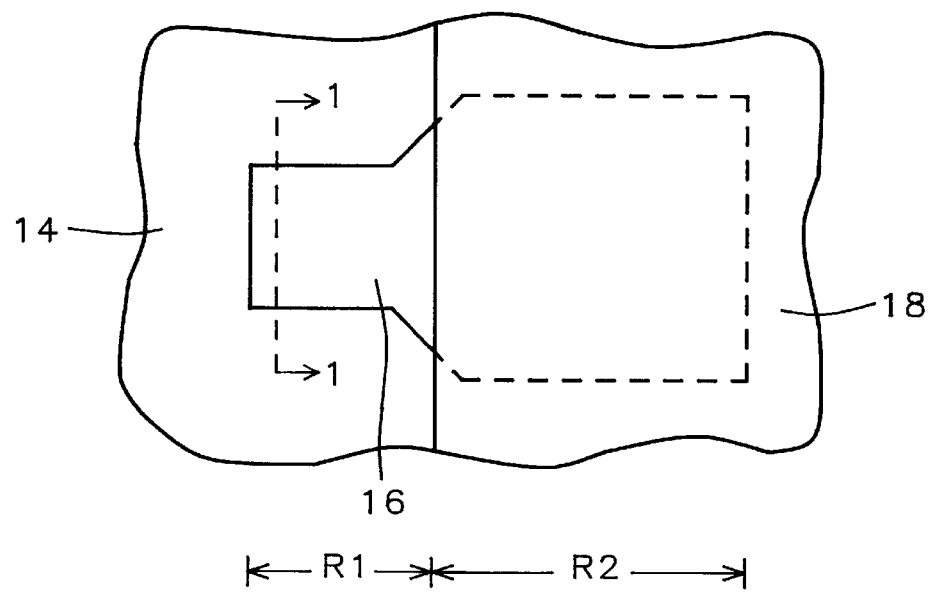
FIG. 3 - Prior Art
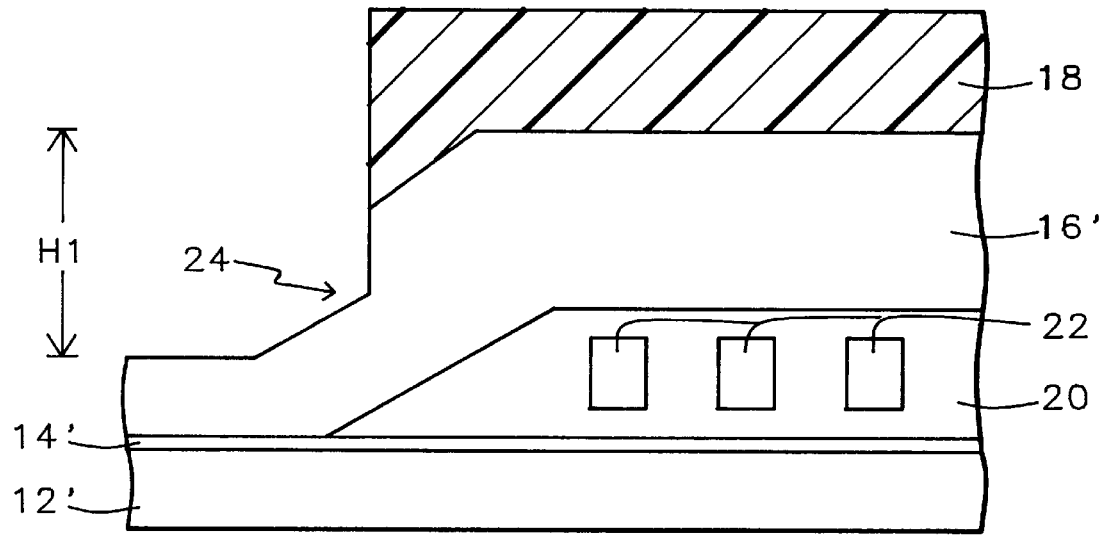
FIG. 4 - Prior Art

POLE TRIMMING METHOD FOR FABRICATING A MAGNETIC TRANSDUCER STRUCTURE

BACKGROUND OF THE INVENTION

1. Field of the Invention

The present invention relates generally to methods for fabricating magnetic transducer structures. More particularly, the present invention relates to a pole trimming method for fabricating inductive magnetic write head structures.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically measured as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic transition density within the magnetic data storage medium. The track width, the track spacing and the linear magnetic transition density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

With regard to the magnetic read-write characteristics of a magnetic read-write head employed in reading and writing digitally encoded magnetic data from and into a magnetic data storage medium, it is known in the art of magnetic read-write head fabrication that increased track spacings of magnetic data tracks within magnetic data storage media are required when employing inductive magnetic write heads which exhibit increased write fringe fields bridging their magnetic transducer pole layers. Increased write fringe field widths within inductive magnetic write heads typically result from non-symmetric magnetic pole layers within those inductive magnetic write heads. A schematic cross-sectional diagram of a typical inductive magnetic write head formed with non-symmetric magnetic pole layers is illustrated in FIG. 1.

Shown in FIG. 1 is a substrate 10 having formed thereupon a lower magnetic pole layer 12 separated from an upper magnetic pole tip 16a within a patterned upper magnetic pole layer 16 by a gap filling dielectric layer 14. Also shown in FIG. 1 bridging from the lower magnetic pole layer 12 to the patterned upper magnetic pole layer 16 is a pair of write fringe fields 15a and 15b.

It is also known in the art of magnetic read-write head fabrication that write fringe fields, such as the write fringe fields 15a and 15b as illustrated in FIG. 1, formed incident to non-symmetric magnetic pole layer alignment within inductive magnetic write heads, may be significantly reduced by partially etching the wider of the two non-symmetric magnetic pole layers while employing the narrower of the two non-symmetric magnetic pole layers as a mask to form within the wider of the two non-symmetric magnetic pole layers a pole tip self-aligned with the pole tip within the narrower of the two non-symmetric magnetic pole layers. A schematic cross-sectional diagram illustrating the results of such partial etching practiced upon the lower magnetic pole layer 12 as illustrated in FIG. 1 is shown in FIG. 2.

Shown in FIG. 2 is a partially etched lower magnetic pole layer 12' having formed therein a lower magnetic pole tip 12a separated from the upper magnetic pole tip 16a within a partially etched patterned upper magnetic pole layer 16' by a patterned gap filling dielectric layer 14'. There is also shown in FIG. 2 bridging from the partially etched patterned upper magnetic pole layer 16' to the partially etched lower magnetic pole layer 12' a pair of significantly reduced write fringe fields 15a' and 15b'.

While the inductive magnetic write transducer structure as illustrated in FIG. 2 typically exhibits significantly reduced write fringe fields in comparison with the inductive magnetic write transducer structure as illustrated in FIG. 1, the inductive magnetic write transducer structure as illustrated in FIG. 2 is typically not formed entirely without difficulties. One of the difficulties typically encountered when forming the inductive magnetic write transducer structure as illustrated in FIG. 2 is that a substantial portion of the patterned upper magnetic pole layer 16' under circumstances where: (1) the lower magnetic pole layer 12 and the patterned upper magnetic pole layer 16 are both formed of a permalloy (ie: nickel-iron, 80:20 w/w) magnetic material, as is common in the art of magnetic read-write head fabrication, (2) the gap filling dielectric layer 14 is simultaneously formed of an aluminum oxide dielectric material, as is similarly common in the art of magnetic read-write head fabrication; and (3) the magnetic write transducer structure whose schematic cross-sectional diagram is illustrated in FIG. 2 is etched from the magnetic write transducer structure whose schematic cross-sectional diagram is illustrated in FIG. 1 through an ion beam etch (IBE) method employing argon ions, as is similarly also common in the art of magnetic read-write head fabrication. The substantial portion of the patterned upper magnetic pole layer 16 is typically eroded due to an ion beam etch (IBE) selectivity of the ion beam etch (IBE) method for the patterned upper magnetic pole layer 16 with respect to the gap filling dielectric layer 14. Typically, the ion beam etch selectivity of the patterned upper magnetic pole layer 16, when formed of a permalloy magnetic material, with respect to the gap filling dielectric layer 14, when formed of an aluminum oxide dielectric material, is from about 1:0.3 to about 1:0.6.

Erosion of upper magnetic pole layers, such as the patterned upper magnetic pole layer 16, has been noted in the art of inductive magnetic read-write head fabrication, and it is typical in the art of inductive magnetic read-write head fabrication to compensate for the erosion by forming an upper magnetic pole layer with a substantial additional thicknesses beyond the thickness ultimately desired for a partially etched upper magnetic pole layer formed from the upper magnetic pole layer. See, for example, Krounbi et al., U.S. Pat. No. 5,438,747 (col. 11, line 68 to col. 12, line 5). Unfortunately, patterned upper magnetic pole layers, such as the patterned upper magnetic pole layer 16, formed with substantial additional thicknesses and thus significant aspect ratios, are often difficult to reproducibility form within magnetic transducer structures.

Although not specifically illustrated in FIG. 2, when fabricating a merged inductive write-magnetoresistive (MR)

read magnetic head from the magnetic transducer structure whose schematic cross-sectional diagram is illustrated in FIG. 2, the partially etched lower magnetic pole layer 12' also serves as a top shield layer for a magnetoresistive (MR) sensor layer formed beneath the partially etched lower magnetic pole layer 12' within the merged inductive write-magnetoresistive (MR) read magnetic head. Under such circumstances, it is important that the partially etched lower magnetic pole layer 12' have sufficient remaining thicknesses at locations other than the location of the lower magnetic pole tip 12a in order to serve adequately as a top shield layer within the merged inductive write-magnetoresistive (MR) read magnetic head. While it is theoretically possible to assure adequate thicknesses of various portions of the partially etched lower magnetic pole layer 12' by increasing the thickness of the lower magnetic pole layer 12 from which is formed the partially etched lower magnetic pole layer 12', unfortunately, the thickness to which the lower magnetic pole layer 12 may be formed is itself often limited by design considerations when fabricating an inductive write-magnetoresistive (MR) read magnetic head.

A related consideration pertinent to providing the partially etched lower magnetic pole layer 12' with sufficient thicknesses at locations other than the location of the lower magnetic pole tip 12a to serve adequately as a top shield layer for a magnetoresistive (MR) sensor layer fabricated beneath the partially etched lower magnetic pole layer 12' is that the etch rate of the partially etched lower magnetic pole layer 12' near the upper magnetic pole tip 16a within the partially etched patterned upper magnetic pole layer 16' is, as is illustrated in FIG. 2, reduced. The etch rate is reduced due to a shadowing effect inherent in the ion beam etch (IBE) method through which is conventionally formed the partially etched lower magnetic pole layer 12'. Due to the shadowing when the partially etched lower magnetic pole layer 12' is formed through the ion beam etch (IBE) method, there is formed as illustrated in FIG. 2 the lower magnetic pole tip 12a with a projection $T_2$ with respect to immediately surrounding portions of the partially etched lower magnetic pole layer 12', while portions of the partially etched lower magnetic pole layer 12' further removed from the lower magnetic pole tip 12a are etched to remove a thickness $T_1$ with respect to the lower magnetic pole layer 12, as illustrated in FIG. 2. In that regard, it is desirable within merged inductive write-magnetoresistive (MR) read magnetic head fabrication to provide partially etched lower magnetic pole layers, such as the partially etched lower magnetic pole layer 12', formed through etch methods which provide minimal shadowing, thus yielding partially etched lower magnetic pole layers where values of parameters which correspond with $T_1$ and $T_2$ are most closely approximate.

By way of example, if it is assumed that: (1) the etch rate of the material from which is formed the gap filling dielectric layer 14 as shown in FIG. 1 is equal to $R_{gap}$; (2) the etch rate of the material from which is formed the lower magnetic pole layer 12 as shown in FIG. 1 is equal to $R_{ip}$; (3) the gap thickness is equal to G as shown in FIG. 2; (4) the etch time is equal to t; and, (5) the convention ion beam etch (IBE) method shadowing effect provides an etch rate of the portion of the partially etched lower magnetic pole layer 12' most closely adjoining the partially etched patterned upper magnetic pole layer 16' one half the etch rate of the patterned lower magnetic pole layer 12' further removed from the partially etched patterned upper magnetic pole layer 16', as illustrated in FIG. 2, then the thicknesses $T_1$ as illustrated in FIG. 2 is determined in accord with equation 1 and the thickness $T_2$ as illustrated in FIG. 2 is determined in accord with equation 2.

$$T_1=(t-G/R_{gap})R_{ip} \tag{1}$$

$$T_2=(t-2G/R_{gap})R_{ip}/2=nG \tag{2}$$

Within equation 2, n typically varies from about 0.5 to about 3. Equation 3, equation 4 and equation 5 then follow from equation 1 and equation 2

$$t=2nG/R_{ip}+2G/R_{gap} \tag{3}$$

$$T_1=(2nG/R_{ip}+G/R_{gap})R_{ip} \tag{4}$$

$$T_1/T_2=T_1/nG=2+R_{ip}/nR_{gap} \tag{5}$$

Thus, it is seen from equation 5 that by selectively etching the material from which is formed the gap filling dielectric layer 14 with respect to the material from which is formed the lower magnetic inductor pole layer 12 within FIG. 1 there will be minimized the magnitude of $T_1$ with respect to $T_2$ as illustrated in FIG. 2.

A related difficulty encountered when forming from the patterned upper magnetic pole layer 16 whose schematic cross-sectional diagram is illustrated in FIG. 1 the partially etched patterned upper magnetic pole layer 16' whose schematic cross-sectional diagram is illustrated in FIG. 2 is illustrated by the schematic plan-view diagram of FIG. 3 and the schematic cross-sectional diagram of FIG. 4. The schematic plan-view diagram of FIG. 3 corresponds with the schematic cross-sectional diagram of FIG. 1. Shown in FIG. 3 is the gap filling dielectric layer 14 having formed thereupon the patterned upper magnetic pole layer 16, which in turn in part has formed thereupon a patterned photoresist layer 18 as is commonly employed to protect the coil region R2 of the patterned upper magnetic pole layer 16 when etching the pole tip region R1 of the patterned upper magnetic pole layer 16 to form the partially etched patterned upper magnetic pole layer 16'. Shown in FIG. 4 is a schematic cross-sectional diagram illustrating the results of etching the patterned upper magnetic pole layer 16 whose schematic plan-sectional diagram is illustrated in FIG. 3 to form the partially etched patterned upper magnetic pole layer 16'. The schematic cross-sectional diagram of FIG. 4 is obtained through the cross-sectional plan perpendicular to the cross-sectional plane employed in obtaining the schematic cross-sectional diagram of FIG. 2.

Shown in FIG. 4 is the partially etched lower magnetic pole layer 12' having formed thereupon the patterned gap filling dielectric layer 14' which in turn has formed thereupon or thereover: (1) a magnetic coil isolation dielectric layer 20 having formed therein a series of magnetic coils 22; (2) the partially etched patterned upper magnetic pole layer 16'; (3) and the patterned photoresist layer 18. As is illustrated in FIG. 4, the partially etched patterned upper magnetic pole layer 16' has a step 24 formed therein at the location of the patterned photoresist layer 18. The step 24 contributes to a significant step height H1 between the pole tip region R1 of the partially etched patterned upper magnetic pole layer 16' and the coil region R2 of the partially etched patterned upper magnetic pole layer 16'. Significant step heights within magnetic pole layers such as the partially etched patterned upper magnetic pole layer 16' are undesirable within the art of inductive magnetic read-write head fabrication since it is often difficult to accurately and reproducibly form upon those magnetic pole layers subsequent layers within the inductive magnetic read-write heads within which are formed those magnetic pole layers.

Various additional features of magnetic pole layer fabrication for use within inductive magnetic write heads have been disclosed by Krounbi et at. in U.S. Pat. No. 5,438,747, the teachings of which are incorporated herein fully by reference.

It is thus desirable to form within magnetic transducer structures which may be employed within inductive magnetic write heads self-aligned partially etched lower magnetic pole layers of permalloy alloy magnetic materials separated by patterned gap filling dielectric layers of aluminum oxide dielectric materials from partially etched patterned upper magnetic pole layers of permalloy alloy magnetic materials with minimal consumption of the partially etched patterned upper magnetic pole layers. It is also desirable to form within magnetic transducer structures which may be employed within inductive magnetic read-write heads partially etched patterned upper magnetic pole layers of enhanced flatness. Most desirable in the art are magnetic transducer structures which simultaneously possess the foregoing two characteristics. It is towards the foregoing goals the present invention is more specifically directed.

SUMMARY OF THE INVENTION

A first object of the present invention is provide a self aligned method for forming within a magnetic transducer structure which may be employed within an inductive magnetic head a partially etched lower magnetic pole layer having formed therein a lower magnetic pole tip separated from an upper magnetic pole tip within a partially etched patterned upper magnetic pole layer by a patterned gap filling dielectric layer, with minimal consumption of the partially etched patterned upper magnetic pole layer.

A second object of the present invention is to provide a method in accord with the first object of the present invention, wherein the partially etched lower magnetic pole layer and the partially etched patterned upper magnetic pole layer are formed of a permalloy (ie: nickel-iron 80:20 w/w) magnetic material and the patterned gap filling dielectric layer is formed of an aluminum oxide gap filling dielectric material.

A third object of the present invention is to provide a method in accord with the second object of the present invention, wherein the partially etched patterned upper magnetic pole layer is formed with enhanced flatness.

A fourth object of the present invention is to provide a method in accord with the first object of the present invention, the second object of the present invention and the third object of the present invention, which method is readily manufacturable.

In accord with the objects of the present invention, there is provided by the present invention a method for fabricating a magnetic transducer structure which maybe employed within an inductive magnetic read-write head. To practice the method of the present invention, there is first provided a substrate. There is then formed over the substrate a lower magnetic pole layer. There is then formed upon the lower magnetic pole layer a gap filling dielectric layer. There is then formed at least in part upon the gap filling dielectric layer a patterned positive photoresist layer employed in defining through a plating method a patterned upper magnetic pole layer formed at least in part upon the gap filling dielectric layer. The patterned positive photoresist layer has a first region defining a pole tip region of the patterned upper magnetic pole layer and a second region defining a magnetic coil region of the patterned upper magnetic pole layer. The first region of the patterned positive photoresist layer is then photoexposed either before or after forming through the plating method the patterned upper magnetic pole layer defined by the patterned positive photoresist layer. There is then developed the first region of the patterned positive photoresist layer after forming through the plating method the patterned upper magnetic pole layer defined by the patterned positive photoresist layer. Finally, there is then etched through an anisotropic etch method the patterned upper magnetic pole layer, the gap filling dielectric layer and the lower magnetic pole layer at the location of the first region of the patterned positive photoresist layer to form a partially etched patterned upper magnetic pole layer, an etched gap filling dielectric layer and a partially etched lower magnetic pole layer. The anisotropic etch method has a first etch selectivity of the gap filing dielectric layer with respect to the patterned upper magnetic pole layer of at least about 2:1 and a second etch selectivity of the lower magnetic pole layer with respect to the patterned upper magnetic pole layer of at least about 1:1.

For circumstances where the patterned upper magnetic pole layer and the lower magnetic pole layer are formed of a permalloy magnetic material and the gap filling dielectric layer is formed of an aluminum oxide dielectric material, it has been found experimentally that an anisotropic etch method which fulfills the foregoing etch selectivity characteristics is a reactive ion beam etch (RIBE) method employing a carbon tetrafluoride etchant gas.

In addition, the anisotropic etch method aspect of the present invention may be employed independent of the partial photoexposure of the patterned positive photoresist layer aspect of the present invention.

The present invention provides a self aligned method for forming within a magnetic transducer structure which may be employed within an inductive magnetic write head a partially etched lower magnetic pole layer having formed therein a lower magnetic pole tip separated from an upper magnetic pole tip within a partially etched patterned upper magnetic pole layer by a patterned gap filling dielectric layer, where the partially etched patterned upper magnetic pole layer is formed with minimal consumption of the partially etched patterned upper magnetic pole layer. The present invention realizes the foregoing object by employing within the method of the present invention an anisotropic etch method which has a first etch selectivity of the gap filing dielectric layer with respect to the patterned upper magnetic pole layer of at least about 2:1 and a second etch selectivity of the lower magnetic pole layer with respect to the patterned upper magnetic pole layer of at least about 1:1.

The method of the present invention may be employed when the partially etched lower magnetic pole layer and the partially etched patterned upper magnetic pole layer are formed of a permalloy (ie: nickel-iron 80:20 w/w) magnetic material and the patterned gap filling dielectric layer is formed of an aluminum oxide dielectric material. It has been found experimentally that the foregoing etch selectivity criteria may be fulfilled with respect to a patterned upper magnetic pole layer and a lower magnetic pole layer formed of a permalloy magnetic material and a gap filling dielectric layer formed of an aluminum oxide dielectric material by employing a reactive ion beam etch (RIBE) anisotropic etch method employing a carbon tetrafluoride etchant gas.

Through the method of the present invention there may be formed a partially etched patterned upper magnetic pole layer with enhanced flatness. The method of the present invention realizes this object by employing a single positive photoresist layer which is first patterned to form a patterned positive photoresist layer which is employed in forming through a plating method a patterned upper magnetic pole layer. The patterned positive photoresist layer is subsequently partially photoexposed and selectively removed at the pole tip region of the patterned upper magnetic pole layer when forming through the self aligned method the partially etched patterned upper magnetic pole layer separated from the partially etched lower magnetic pole layer by the etched gap filling dielectric layer.

The method of the present invention is readily manufacturable. The method of the present invention provides a novel ordering of magnetic transducer structure fabrication methods otherwise generally known in the art of magnetic transducer structure fabrication. Thus, the method of the present invention is readily manufacturable.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 to FIG. 4 show a series of schematic cross-sectional and plan-view diagrams illustrating a magnetic transducer structure having increased patterned upper magnetic pole layer consumption and increased patterned upper magnetic pole layer step height incident to forming within the magnetic transducer structure a partially etched patterned upper magnetic pole layer through a method conventional in the art of inductive magnetic read-write head fabrication.

DESCRIPTION OF THE PREFERRED EMBODIMENT

The present invention provides a method for fabricating for use within an inductive magnetic write head a magnetic transducer structure, where a partially etched patterned upper magnetic pole layer formed within the magnetic transducer structure is formed with reduced consumption and with enhanced flatness when forming the partially etched patterned upper magnetic pole layer from a patterned upper magnetic pole layer through a self aligned method which simultaneously forms within a partially etched lower magnetic pole layer a lower magnetic pole tip self aligned and separated by a patterned gap filling dielectric layer from an upper magnetic pole tip within the partially etched patterned upper magnetic pole layer. The decreased consumption of the partially etched patterned upper magnetic pole layer is realized by employing within the method of the present invention an anisotropic etch method which has a first etch selectivity of the gap filling dielectric layer with respect to the patterned upper magnetic pole layer of at least about 2:1 and a second etch selectivity of the lower magnetic pole layer with respect to the patterned upper magnetic pole layer of at least about 1:1. For magnetic transducer structures where the upper magnetic pole layer and the lower magnetic pole layer are formed of a permalloy magnetic material and the gap filling dielectric layer is formed of an aluminum oxide dielectric material, such an anisotropic etch method is a reactive ion beam etch (RIBE) method employing a carbon tetrafluoride etchant. The enhanced flatness of the partially etched patterned upper magnetic pole layer is realized through employing when forming the partially etched patterned upper magnetic pole layer through a plating method a patterned positive photoresist layer a portion of which is photoexposed and subsequently developed prior to employing the anisotropic etch method in forming the partially etched patterned upper magnetic pole layer.

Although the preferred embodiment of the method of the present invention illustrates the method of the present invention employed in forming a magnetic transducer structure employed within an inductive write-magnetoresistive (MR) read magnetic head employed within digitally encoded magnetic data storage and retrieval, the method of the present invention may also be employed in forming magnetic transducer structures employed within other analog or digital magnetic reading and writing applications. The method of the present invention may be employed in forming magnetic transducer structures for use within magnetic heads including but not limited to inductive read magnetic heads, inductive write magnetic heads, inductive read-write magnetic heads and inductive write-magnetoresistive (MR) magnetic heads.

Figure 5:
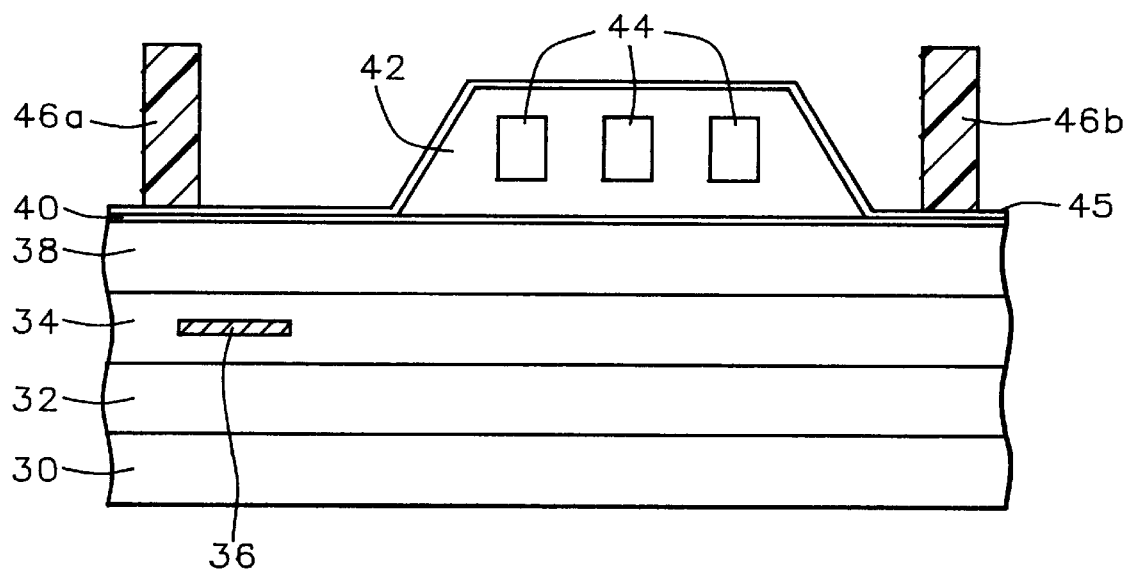
FIG. 5 to FIG. 12 show a series of schematic cross-sectional and plan-view diagrams illustrating the results of progressive stages in forming in accord with a preferred embodiment of a method of the present invention an inductive write-magnetoresistive (MR) read magnetic transducer structure employed within an inductive write-magnetoresistive (MR) read magnetic head employed within digitally encoded magnetic data storage and retrieval.

Referring now to FIG. 5 to FIG. 12 there is shown a series of schematic cross-sectional and plan-view diagrams illustrating the results of progressive stages in forming a magnetic transducer structure employed within an inductive write-magnetoresistive (MR) read magnetic head in accord with a preferred embodiment of the present invention. Shown in FIG. 5 is a schematic cross-sectional diagram of the magnetic transducer structure at an early stage in its fabrication.

Shown in FIG. 5 is a substrate 30 having formed thereupon or thereover several layers which are employed in forming the magnetic transducer structure as well as the inductive write-magnetoresistive (MR) read magnetic head. The layers include: (1) a first shield layer 32 formed upon the substrate 30; (2) a first dielectric layer 34 having a magnetoresistive (MR) sensor layer 36 formed therein formed upon the first shield layer 32; (3) a lower magnetic pole layer 38 (which also serves as a second shield layer) formed upon the first dielectric layer 34; (4) a gap filling dielectric layer 40 formed upon the lower magnetic pole layer 38; (5) a magnetic coil isolation dielectric layer 42 having formed therein a series of magnetic coil layers 44 formed upon the gap filling dielectric layer 40; (6) a seed layer 45 formed upon the magnetic coil isolation dielectric layer 42 and in part upon the gap filling dielectric layer 40; and (7) a pair of patterned positive photoresist layers 46a and 46b formed upon the seed layer 45. Each of foregoing substrate and layers may be formed through methods and materials as are generally known in the art of magnetic read-write head fabrication.

For example, although it is known in the art of magnetic read-write head fabrication that substrates are typically formed from non-magnetic ceramic materials including but not limited to oxides, nitrides, carbides, borides and mixtures of oxides, nitrides, carbides and borides, for the preferred embodiment of the present invention, the substrate 30 is preferably formed of a aluminum oxide-titanium carbide non-magnetic ceramic material. Preferably, the substrate 30 is formed with sufficient dimensions such that the substrate 30 may be fabricated into a slider employed within a direct access storage device (DASD) magnetic data storage enclosure employed within magnetic data storage and retrieval.

Similarly, although it is also known in the art of magnetic read-write head fabrication that shield layers and magnetic pole layers are typically formed of soft magnetic materials such as but not limited to permalloy (nickel-iron alloy) soft magnetic materials and higher order alloy soft magnetic materials incorporating permalloy soft magnetic materials, for the preferred embodiment of the present invention, both the first shield layer 32 and the lower magnetic pole layer 38 which simultaneously serves as a second shield layer are preferably formed of a permalloy (nickel-iron, 80:20 w/w) soft magnetic material. Preferably, the first shield layer is formed to a thickness of from about 1.5 to about 2.5 micrometers, while the lower magnetic pole layer 38 is formed to a thickness of from about 2.0 to about 4.0 micrometers.

Yet similarly, although it is also known in the art of magnetic read-write head fabrication that dielectric layers may be formed through any of several methods and materials, including but not limited to chemical vapor deposition (CVD) methods, plasma enhanced chemical vapor deposition (PECVD) methods and physical vapor deposition (PVD) sputtering methods through which may be formed dielectric layers of dielectric materials including but not limited to silicon oxide dielectric materials, silicon nitride dielectric materials and aluminum oxide dielectric materials, for the preferred embodiment of the present invenion, each of the first dielectric layer 34 and the gap filling dielectric layer 40 is preferably formed of an aluminum oxide dielectric material deposited through a physical vapor deposition (PVD) sputtering method, as is most common in the art of magnetic read-write head fabrication. Preferably, the first dielectric layer 34 is formed to a thickness of from about 0.1 to about 0.6 micrometers, while the gap filling dielectric layer 40 is preferably also formed to a thickness of from about 0.1 to about 0.6 micrometers. In contrast, within the preferred embodiment of the present invention the magnetic coil isolations dielectric layer 42 is preferably formed of a hard baked photoresist material, hard baked to a thickness of from about 8 to about 20 micrometers.

Still yet similarly, the magnetoresistive (MR) sensor layer 36 is, as is understood by a person skilled in the art, preferably formed of at least a bilayer comprising: (1) a patterned magnetoresistive (MR) material layer having formed upon it ends; (2) a pair of patterned permanent magnet layers or a pair of patterned anti-ferromagnetic material layers, to induce a longitudinal magnetic biasing into the patterned magnetoresistive (MR) layer. For the preferred embodiment of the present invention, the patterned magnetoresistive (MR) layer is preferably formed of a permalloy magnetoresistive (MR) material formed to a thickness of from about 100 to about 300 angstroms, while each of the pair of patterned permanent magnet layers or each of the pair of patterned anti-ferromagnetic material layers is formed to a thickness of about 100 to about 300 angstroms upon opposite ends of the patterned magnetoresistive (MR) layer to define a trackwidth of the patterned magnetoresitive (MR) layer of from about 0.5 to about 3.0 microns.

In addition, the series of magnetic coil layer 44 may similarly be formed through any of several methods and materials, including conventional photolithographic methods through which may be formed within magnetic transducer structures coil layers of conductor materials including but not limited to copper containing conductor materials, aluminum containing conductor materials and gold containing conductor materials. For the preferred embodiment of the present invention, each magnetic coil layer within the series of magnetic coil layers 44 is preferably formed of a copper containing conductor material, as is most common in the art of magnetic transducer structure fabrication as employed within inductive magnetic read-write head fabrication. Preferably, each of the magnetic coil layers within the series of magnetic coil layers 44 is formed to a thickness of from about 2.0 to about 6.0 micrometers within the magnetic coil isolation dielectric layer 42.

Further, while it is also known in the art of magnetic read-write head fabrication that seed layers may be formed through any of several methods and materials, including but not limited to electroless plating deposition methods, chemical vapor deposition (CVD) methods and physical vapor deposition (PVD) methods through which may be formed seed layers of seed materials including but not limited to copper containing seed materials, aluminum containing seed materials and conductive magnetic seed materials such as but not limited to permalloy conductive magnetic seed materials, for the preferred embodiment of the present invention the seed layer 45 is preferably formed of a permalloy conductive magnetic seed material formed to a thickness of from about 500 to about 1500 angstroms upon the magnetic coil isolation dielectric layer 42 and in part upon the gap filling dielectric layer 40.

Finally, with respect to the patterned positive photoresist layers 46a and 46b, the patterned positive photoresist layers 46a and 46b may similarly be formed from any of several positive photoresist materials as are conventionally employed in the art of magnetic read-write head fabrication. Preferably, the patterned positive photoresist layers 46a and 46b are formed of a positive photoresist material with optimal dimensional stability within the fabrication processes through which the patterned positive photoresist layers 46a and 46b will subsequently be exposed. Preferably, the patterned positive photoresist layers 46a and 46b are formed to a thickness upon the seed layer 45 of from about 5 to about 8 micrometers each.

Figure 6:
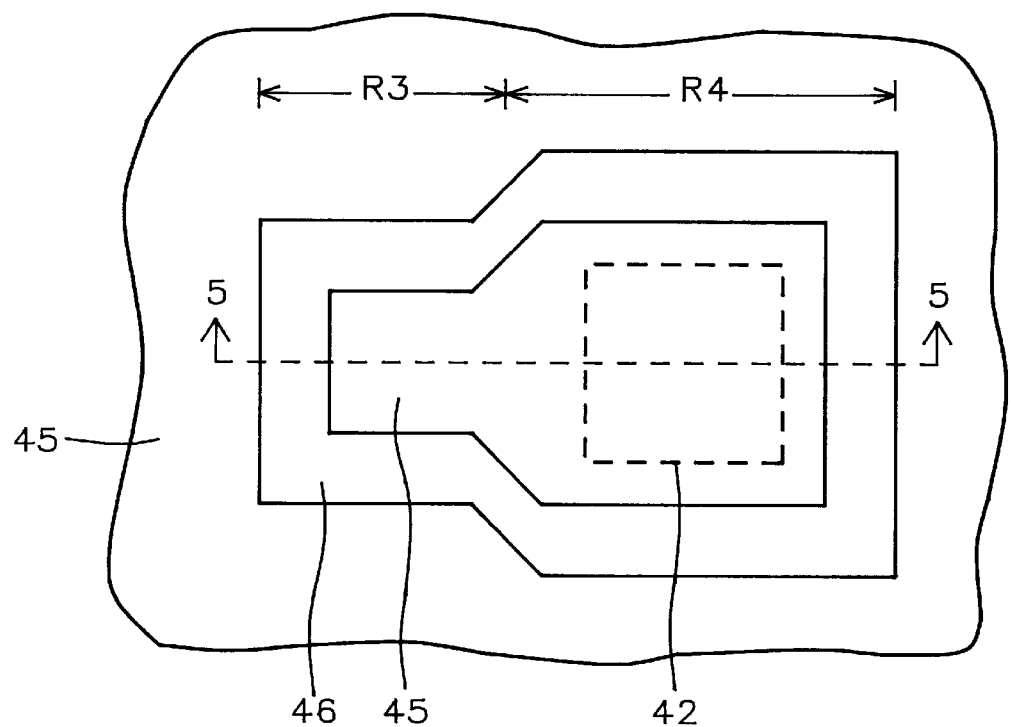

Referring now to FIG. 6, there is shown a schematic plan-view diagram of the magnetic transducer structure corresponding with the magnetic transducer structure whose schematic cross-sectional diagram is shown in FIG. 5. Shown in FIG. 6 is the seed layer 45 having formed thereupon the patterned positive photoresist layer 46, where the seed layer 45 also has formed thereunder the magnetic coil isolation dielectric layer 42, which magnetic coil isolation dielectric layer 42 is contained within the inner boundary of the patterned positive photoresist layer 46. As is illustrated in FIG. 6, the patterned positive photoresist layer 46 forms a patterned positive photoresist frame into which is subsequently formed through a plating method a patterned upon magnetic pole layer. As is also illustrated in FIG. 6, the patterned positive photoresist layer 46 has a pole tip region R3 of the patterned positive photoresist layer 46 and a coil region R4 of the patterned positive photoresist layer 46.

Figure 7:
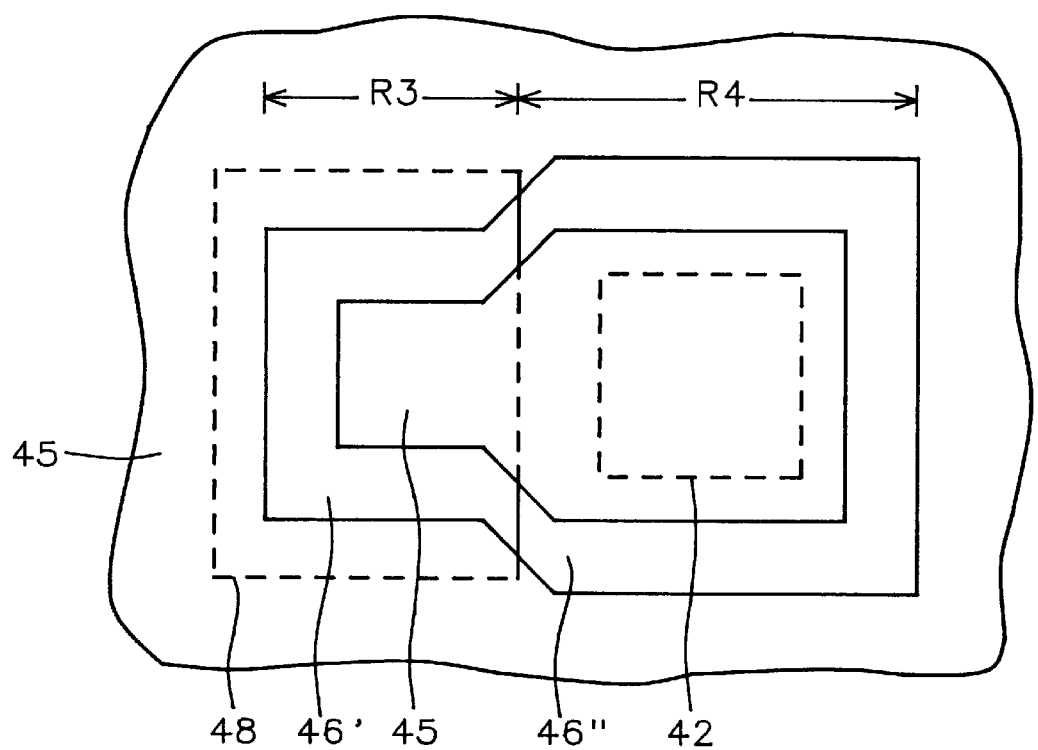

Referring now to FIG. 7, there is shown a schematic plan-view diagram illustrating the results of further processing of the magnetic transducer structure whose schematic plan-view diagram is illustrated in FIG. 6. Shown in FIG. 7 is a schematic plan-view diagram of a magnetic transducer structure otherwise equivalent to the magnetic transducer structure whose schematic plan-view diagram is illustrated in FIG. 6, but wherein the pole tip region R3 of the patterned positive photoresist layer 46 has been photoexposed through a photoexposure window 48, thus forming from the patterned positive photoresist layer 46 a photoexposed patterned positive photoresist layer 46' within the pole tip region R3 of the patterned positive photoresist layer 46 and a non-photoexposed patterned positive photoresist layer 46" within the coil region R4 of the patterned positive photoresist layer. The pole tip region R3 of the patterned positive photoresist layer 46 may be photoexposed to form the photoexposed pattern positive photoresist layer 46' and the non-photoexposed patterned positive photoresist layer 46" through photoexposure methods analogous or equivalent to the photoexposure methods employed in forming the patterned positive photoresist layer 46 from a corresponding blanket positive photoresist layer.

Figure 8:
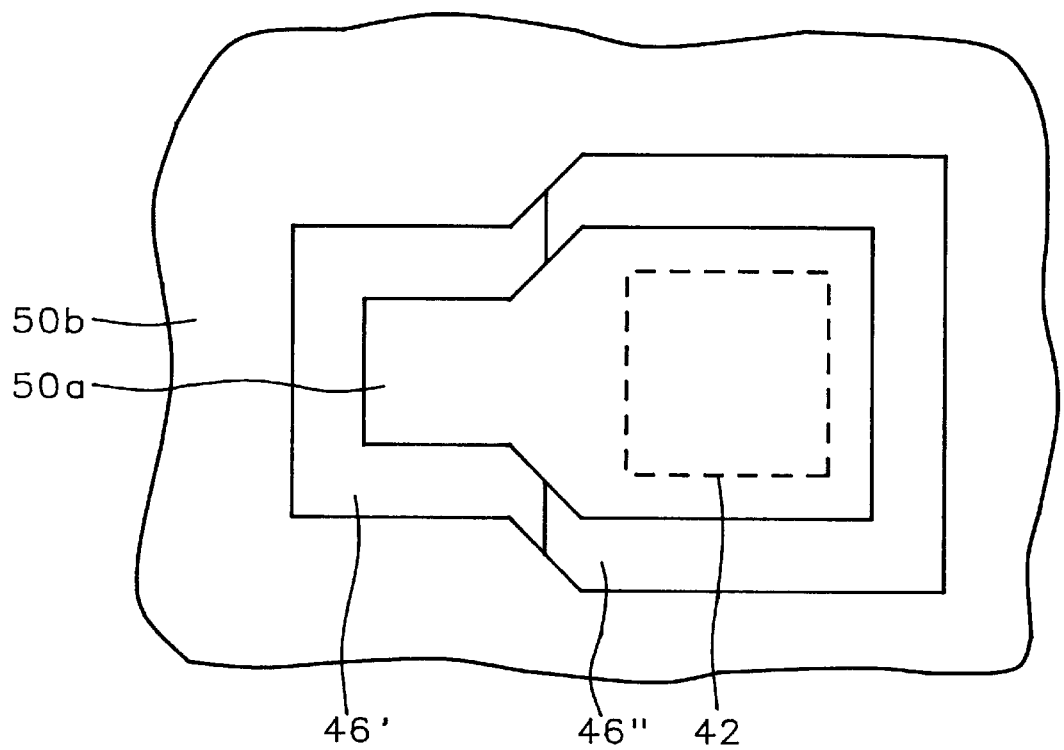

Referring now to FIG. 8, there is shown a schematic plan-view diagram illustrating the results of further processing of the magnetic transducer structure whose schematic plan-view diagram is illustrated in FIG. 7. Shown in FIG. 8 is a magnetic transducer structure otherwise equivalent to the magnetic transducer structure whose schematic plan-view diagram is illustrated in FIG. 7, but upon whose surface is formed through an electrochemical plating method: (1) a plated upper magnetic pole layer 50a bounded by the photoexposed patterned positive photoresist layer 46' and the non-photoexposed patterned positive photoresist layer 46"; and (2) a plated upper magnetic pole layer residue 50b at locations other than those bounded by the photoexposed patterned positive photoresist layer 46' and the n on-photoexposed patterned positive photoresist layer 46". The plated upper magnetic pole layer 50a and the plated upper magnetic pole layer residue 50b are formed through electrochemical plating methods and materials as are conventional in the art of magnetic read-write head fabrication. For the preferred embodiment of the present invention, the plated upper magnetic pole layer 50a and the plated upper magnetic pole layer residue 50b are each preferably formed of a permalloy magnetic material, electrochemically plated to a thickness of no greater than the thickness of the patterned positive photoresist layer 46, which will typically provide the plated upper magnetic pole layer 50a and the plated upper magnetic pole layer residue 50b of from about 2.0 to about 6.0 micrometers thickness each.

As is understood by a person skilled in the art, although the preferred embodiment of the method of the present invention illustrates the photoexposure of the patterned positive photoresist layer 46 in forming the photoexposed patterned positive photoresist layer 46' and the non-photoexposed patterned positive photoresist layer 46" prior to employing the electrochemical plating method in forming the plated upper magnetic pole layer 50a and the plated upper magnetic pole layer residue 50b, the ordering of the preceding photoexposure and plating process steps may alternatively be reversed within the method of the present invention.

Similarly, as is also understood by a person skilled in the art, although the preferred embodiment of the present invention illustrates an electrochemical plating method in forming the plated upper magnetic pole layer 50a and the plated upper magnetic pole layer residue 50b, plating methods other than electrochemical plating methods may also be employed in forming the plated upper magnetic pole layer 50a and the plated upper magnetic pole layer residue 50b, provided that the patterned positive photoresist layer 46, the photoexposed patterned positive photoresist layer 46' and the non-photoexposed patterned positive photoresist layer 46" remain unplated. Such other plating methods will typically include, but are not limited to, electroless plating methods.

Figure 9:
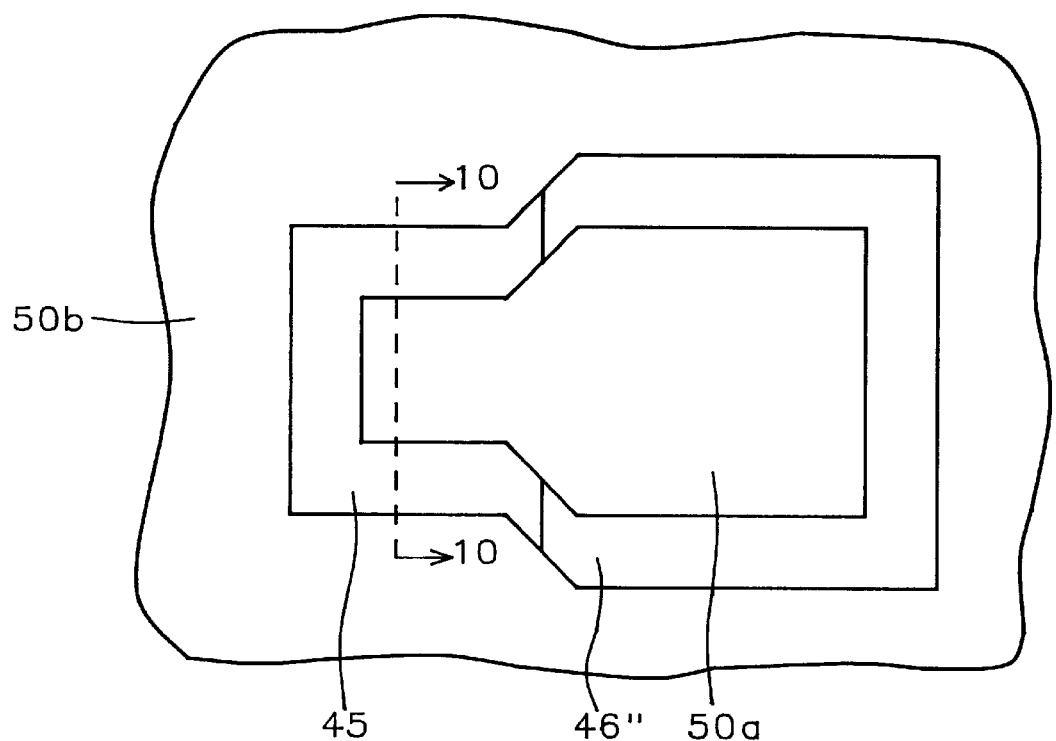

Referring now to FIG. 9, there is shown a schematic plan-view diagram illustrating the results of further processing of the magnetic transducer structure whose schematic plan-view diagram is illustrated in FIG. 8. Shown in FIG. 9 is a schematic plan-view diagram of a magnetic transducer structure otherwise equivalent to the magnetic transducer structure whose schematic plan view diagram is illustrated in FIG. 8, but wherein the photoexposed patterned positive photoresist layer 46' has bene removed to leave exposed thereunder a portion of the seed layer 45. The photoexposed patterned positive photoresist layer 46' is removed to leave exposed the portion of the seed layer 45 through a photoresist development method analogous or equivalent to the photoresist development method employed in forming the patterned positive photoresist layer 46 from a corresponding blanket positive photoresist layer.

Figure 10:
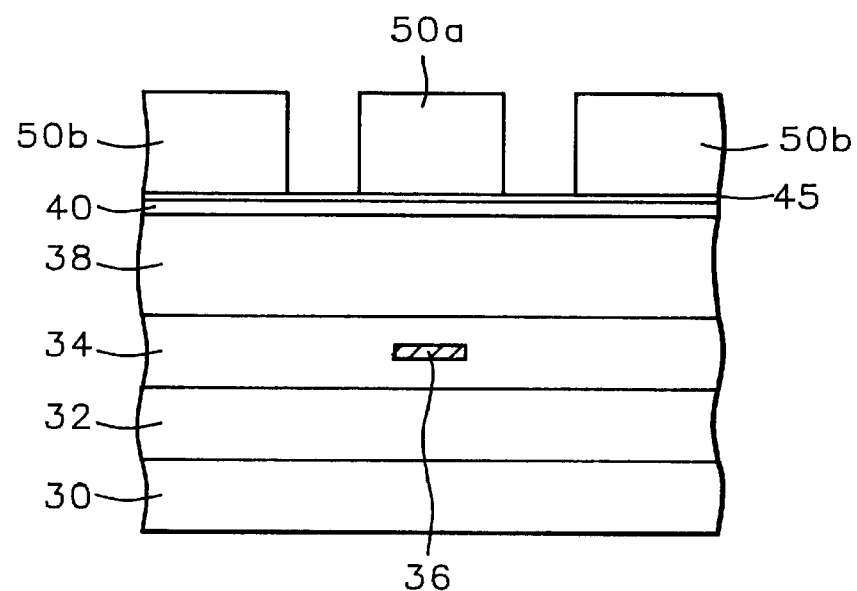

Referring now to FIG. 10, there is shown a schematic cross-sectional diagram of a magnetic transducer structure corresponding with the magnetic transducer structure whose schematic plan-view diagram is shown to FIG. 9. The magnetic transducer structure whose schematic cross-sectional diagram is shown in FIG. 10 shows no further processing in comparison with the magnetic transducer structure whose schematic plan-view diagram is illustrated in FIG. 9.

Figure 11:
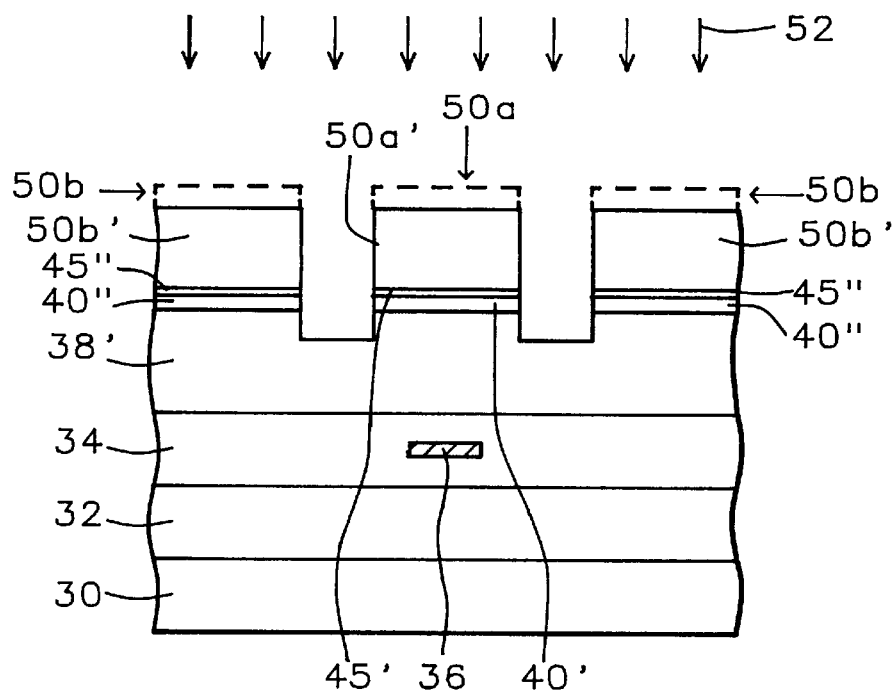

Referring now to FIG. 11, there is shown a schematic cross-sectional diagram illustrating the results of further processing of the magnetic transducer structure whose schematic cross-sectional diagram is illustrated in FIG. 10. Shown in FIG. 11 is a schematic cross-sectional diagram of a magnetic transducer structure otherwise equivalent to the magnetic transducer structure whose schematic cross-sectional diagram is illustrated in FIG. 10, but wherein the seed layer 45, the gap filling dielectric layer 40 and the lower magnetic pole layer 38 have been etched while employing the plated upper magnetic pole layer 50a and the plated upper magnetic pole layer residue 50b as a mask to form the partially etched lower magnetic pole layer 38', the patterned gap filling dielectric layer 40', the patterned gap filling dielectric layer residues 40", the patterned seed layer 45', the patterned seed layer residues 45", the partially etched plated upper magnetic pole layer 50a' and the partially etched plated upper magnetic pole layer residues 50b'. As is illustrated in FIG. 11, the foregoing layers have been etched while providing minimal consumption of: (1) the plated upper magnetic pole layer 50a when forming the partially etched plated upper magnetic pole layer 50a'; and (2) the plated upper magnetic pole layer residues 50b when forming the partially etched plated upper magnetic pole layer residues 50b'.

In order to provide minimal consumption of the plated upper magnetic pole layer 50a and the plated upper magnetic pole layer residues 50b when forming the partially etched plated upper magnetic pole layer 50a' and the partially etched plated upper magnetic pole layer residues 50b", there is employed when forming from the plated upper magnetic pole layer 50a and the plated upper magnetic pole layer residues 50b the partially etched plated upper magnetic pole layer 50a' and the partially etched plated upper magnetic pole layer residues 50b an etch method which has an etch selectivity of the gap filling dielectric layer 40 with respect to the plated upper magnetic pole layer 50a or the plated upper magnetic pole layer residues 50b of at least 2:1 and an etch selectivity of the lower magnetic pole layer 38 with respect to the plated upper magnetic pole layer 50a or the plated upper magnetic pole layer residues 50b of at least about 1:1. Within the context of the preferred embodiment of the method of the present invention, where the lower magnetic pole layer 38, the plated upper magnetic pole layer 50*a* and the plated upper magnetic pole layer residues 50*b* are formed of a permalloy magnetic material and the gap filling dielectric layer 40 is formed of an aluminum oxide dielectric material, it has been found experimentally that the foregoing etch selectivity requirements are met when there is employed as is illustrated in FIG. 11 a reactive ion beam etch (RIBE) method employing a reactive ion beam 52 comprising a carbon tetrafluoride etchant gas.

Preferably, the reactive ion beam etch (RIBE) method also employs: (1) a chamber pressure of from about 1E-4 to about 9E-4 torr; (2) an ion beam current of from about 200 to about 800 milliamps and an ion beam voltage of from about 300 to about 800 volts; (3) a substrate temperature of from about 10 to about 80 degrees centigrade; (4) an etchant gas composition of about 100 percent carbon tetrafluoride, and (5) a carbon tetrafluoride flow rate of from about 20 to about 40 standard cubic centimeters per minute (sccm). To provide an optimal reactive ion beam etch (RIBE) method, the reactive ion beam 52 plasma is preferably first ignited with about 15 to about 30 volume percent argon.

Figure 12:
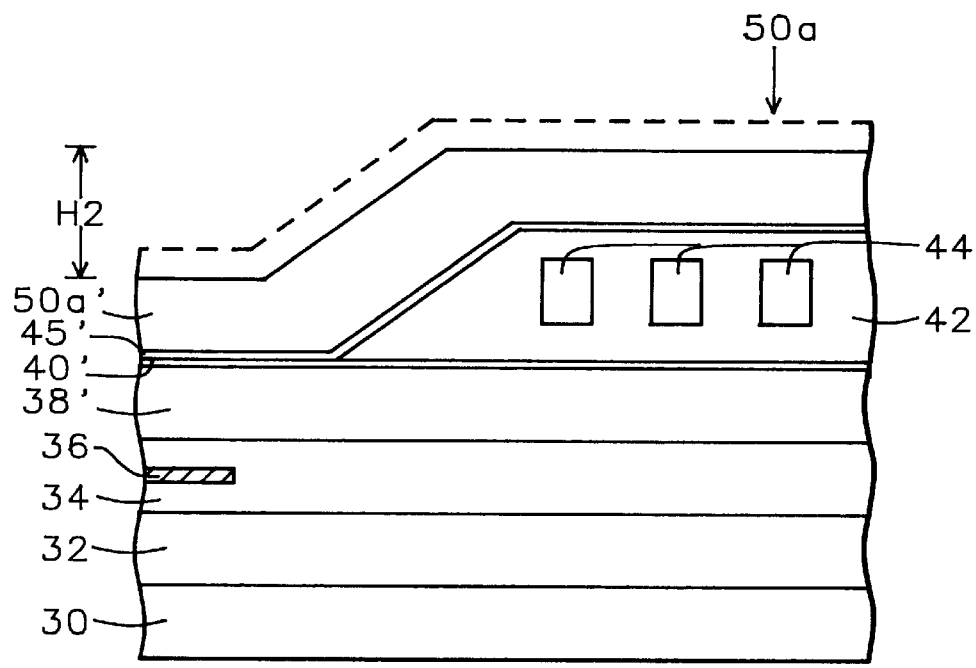

Referring now to FIG. 12, there is shown an alternative schematic cross-sectional diagram of the magnetic transducer structure whose schematic cross-sectional diagram is illustrated in FIG. 11. The alternative schematic cross-sectional diagram of the magnetic transducer structure as illustrated in FIG. 12 is taken through a plane perpendicular to the air bearing surface plane of the schematic cross-sectional diagram of the magnetic transducer structure whose schematic cross-sectional diagram is illustrated in FIG. 11. As is illustrated in FIG. 12, the partially etched plated upper magnetic pole layer 50*a*' is formed in accord with the preferred embodiment of the method of the present invention without an additional step therein beyond the step over the magnetic coil isolation dielectric layer 42. Therefore, the partially etched plated upper magnetic pole layer 50*a*' is formed with a step height H2 less than the step height H1 as illustrated with FIG. 4 for the partially etched patterned upper magnetic pole layer formed through methods as are conventional in the art of magnetic transducer structure fabrication, thus forming the partially etched plated upper magnetic pole layer 50*a*' which is flatter than partially etched patterned upper magnetic pole layers formed through methods as are conventional in the art.

As is understood by a person skilled in the art, the preferred embodiment of the present invention is representative of the method of the present invention rather than limiting of the method of the present invention. Revisions and modifications may be made to materials, structures and dimensions through which is formed the inductive write-magnetoresistive (MR) read magnetic head of the preferred embodiment of the present invention while still providing magnetic transducer structures which are within the spirit and scope of the present invention, as defined by the accompanying claims.

What is claimed is:

1. A method for forming a magnetic transducer structure comprising:

providing a substrate;

forming over the substrate a lower magnetic pole layer;

forming upon the lower magnetic pole layer a gap filling dielectric layer;

forming upon the gap filling dielectric layer a patterned upper magnetic pole layer; and etching through an anisotropic etch method the gap filling dielectric layer and the lower magnetic pole layer while employing the patterned upper magnetic pole layer as a mask to form a partially etched patterned upper magnetic pole layer and a patterned gap filling dielectric layer aligned with a lower magnetic pole tip formed within a partially etched lower magnetic pole layer, wherein:

the patterned upper magnetic pole layer and the lower magnetic pole layer are formed of a permalloy magnetic material;

the gap filling dielectric layer is formed of an aluminum oxide, and the anisotropic etch method is a reactive ion beam etch (RIBE) method employing a carbon tetrafluoride etchant.

2. The method of claim 1 wherein:

the lower magnetic inductor pole layer is from about 2.0 to about 4.0 micrometers thick;

the gap filling dielectric layer is from about 0.1 to about 0.6 micrometers thick;

the patterned upper magnetic inductor pole layer is from about 2.0 to about 6.0 micrometers thick.

3. A magnetic transducer structure formed in accord with the method of claim 1.

4. An inductive magnetic head having formed therein the magnetic transducer structure of claim 3, wherein the inductive magnetic head is selected from the group of inductive magnetic heads consisting of inductive read magnetic heads, inductive write magnetic heads, inductive read-write magnetic heads and inductive write-magnetoresistive (MR) read magnetic heads.

5. A method for forming a magnetic transducer structure comprising:

providing a substrate;

forming over the substrate a lower magnetic pole layer;

forming upon the lower magnetic pole layer a gap filling dielectric layer;

forming at least in part upon the gap filling dielectric layer a patterned positive photoresist layer employed in defining through a plating method an upper magnetic pole layer formed at least in part upon the gap filling dielectric layer the patterned photoresist layer having a first region defining a pole tip of the upper magnetic pole layer and a second region defining a magnetic coil region of the upper magnetic pole layer;

photoexposing the first region of the patterned positive photoresist layer;

forming through the plating method the upper magnetic pole layer defined by the patterned positive photoresist layer;

developing then the first region of the patterned positive photoresist layer; and anisotropically etching then the upper magnetic pole layer, the gap filling dielectric layer and the lower magnetic pole layer at the location of the first region of the patterned positive photoresist layer to form an etched upper magnetic pole layer, an etched gap filling dielectric layer and an etched lower magnetic pole layer, wherein:

the upper magnetic pole layer and the lower magnetic pole layer are each formed of a permalloy magnetic material;

the gap filling dielectric layer is formed of an aluminum oxide dielectric material; and the anisotropic etch method is a reactive ion beam etc (RIBE) anisotropic etch method employing a carbon tetrafluoride etchant gas.

6. A magnetic transducer structure formed in accord with the method of claim 5.

7. An inductive magnetic head having formed therein the magnetic transducer structure of claim 6, wherein the inductive magnetic head is selected from the group of inductive magnetic heads consisting of inductive read magnetic heads, inductive write magnetic heads, inductive read-write magnetic heads and inductive write magnetoresistive (MR) read magnetic heads.

* * * * *